June 24, 1924.
L. VARGA
SLEIGH BRAKE
Filed April 13, 1923
1,499,200
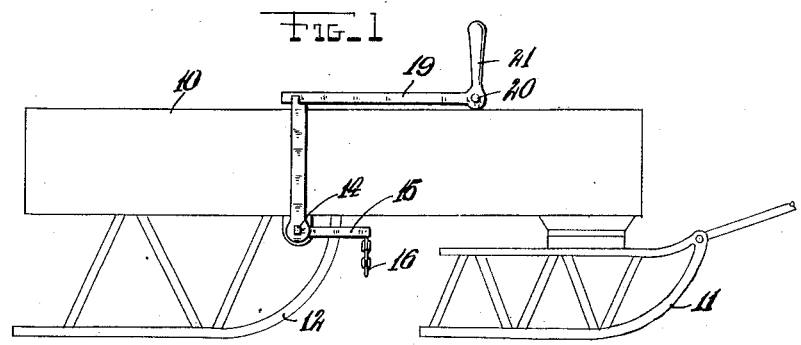
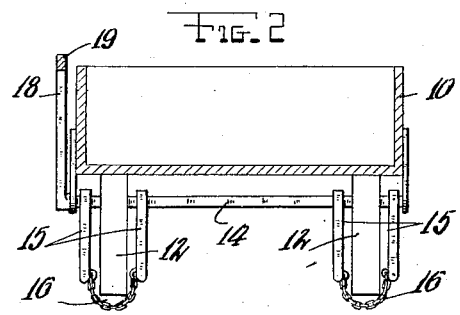
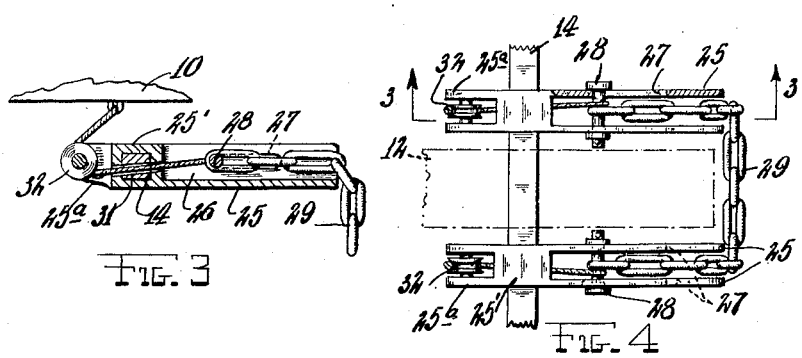
Inventor
Louis Varga
Attorney Patented June 24, 1924.

1,499,200

UNITED STATES PATENT OFFICE.

LOUIS VARGA, OF MARTINS FERRY, OHIO.

SLEIGH BRAKE.

Application filed April 13, 1923. Serial No. 631,874.

*To all whom it may concern:*

Be it known that I, LOUIS VARGA, a citizen of Hungary, residing at Martins Ferry, in the county of Belmont and State of Ohio, have invented certain new and useful Improvements in Sleigh Brakes, of which the following is a specification.

This invention relates to a brake for sleighs, having more particular reference to a brake whose braking element proper is inserted at need between the runner and the snow, the brake being intended more particularly for use in descending hills or inclines with heavy loads.

The invention has for an object to provide a simple and efficient brake of the above type.

For further comprehension of the invention and of the objects and advantages thereof, reference will be had to the following description and accompanying drawings, and to the appended claims in which the various novel features of the invention are more particularly set forth.

Fig. 1 of the drawings is a side view of a sleigh having my improved brake applied thereto, showing the brake element in raised or inoperative position.

Fig. 2 is a transverse section on the line 2—2 of Fig. 1, showing the brake element lowered.

Fig. 3 is a detail longitudinal view showing a modified construction of brake, this view being taken on the line 3—3 of Fig. 4.

Fig. 4 is a detail plan view of the modified brake element shown in Fig. 3.

In the drawings the reference number 10 indicates the body of a sleigh of ordinary construction which is mounted on front runners such as 11 and rear runners such as 12. My improved braking device is preferably applied to one of the rear runners 12, and as shown in Figs. 1 and 2 a transverse bar 14 is suitably pivoted above said rear runners and under the body.

This bar 14 may have squared portions which pass through suitable square openings in the upper ends of pairs of arms 15 which are thereby fixed upon said bar, these arms being fixed to the bar 14 one on each side of the runners 12. To the free ends of these arms are connected the opposite ends of chain lengths 16 which preferably have a certain amount of slack therein.

To hold the brake in raised position an arm 18 is fixed on one end of the bar and projects upwardly therefrom, the upper end of this arm engaging in a notch in the underside of one arm 19 of a bell crank lever pivoted to the body adjacent the driver's seat as at 20 and whose other arm 21 forms an operating handle extending upward adjacent said seat. Any ordinary type of locking means not necessary to be here shown, may be applied to the handle. When this handle is pushed forward the arm is raised and the brake is released, swinging downward by gravity, the chains 16 engaging under the runners 12.

The modified construction shown in Figs. 3 and 4 is designed both to permit of ready detaching of the chains from the brake arms to reset the device in inoperative position at the bottom of an incline, and also automatically pays out the chain as the arms are swung downward.

In this construction pairs of arms 25 are fixed on the bar 14, the arms being channeled on one side from their free ends to their hubs 25' as at 26. The side walls of these channels are longitudinally slotted as at 27 to receive bolts 28 to which the ends of the chains 29 are linked.

Secured each at one end to these bolts 28 are flexible wires 30 which extend through the channels 26 toward the hubs 25', passing through an opening 31 extending completely through hub 25' and the bar 14, the wires finally passing around pulleys 32 carried by extensions of the arms 25$^a$ and being connected at their ends as indicated at 34 to the sleigh body 10.

As will be apparent when the arms swing downward the chains 29 are slackened, the length of the slots 27 being proportioned to limit the movement of the bolts 28. The latter may be held in place by washers 35 and cotter pins 36 whereby they may be readily pulled out if it is desired to detach the chains 29 from the arms 25.

Having thus described my invention what I claim as new and desire to protect by Letters Patent of the United States is as follows:—

1. In a sleigh, a transverse bar pivoted thereto and extending over one of the sleigh runners, a pair of arms fixed to said bar, and a brake chain attached at opposite ends to the free ends of said arms.

2. In a sleigh, a transverse bar pivoted thereto and extending over one of the sleigh runners, a pair of arms fixed to said bar, and a brake chain attached at opposite ends to the free ends of said arms, and means for imparting rotative movement to said bar.

3. In a sleigh, a transverse bar pivoted thereto and extending over one of the sleigh runners, a pair of arms fixed to said bar, and a brake chain attached at opposite ends to the free ends of said arms, and means for automatically slackening said chain as the said arms are swung downward.

4. In a sleigh, a transverse bar pivoted thereto, and extending over one of the sleigh runners, a pair of longitudinally channeled arms fixed to said bar, bolts attached to said bars and having limited movement longitudinally thereof, a chain attached at its opposite ends to said bolts, and ropes attached to said bolts and normally holding the same in a position moved toward the hubs of said arms, said ropes being adapted to allow said bolts to move toward the free ends of said arms as the latter swing downward.

In testimony whereof I have affixed my signature.

LOUIS VARGA.